(12) United States Patent
Bähr et al.

(10) Patent No.: US 11,215,292 B2
(45) Date of Patent: Jan. 4, 2022

(54) MAGNETIC VALVE

(71) Applicant: RAPA Automotive GmbH & Co. KG, Selb (DE)

(72) Inventors: Sebastian Bähr, Selb (DE); Werner Döhla, Selb (DE)

(73) Assignee: RAPA AUTOMOTIVE GMBH & CO. KG, Selb (DE)

( * ) Notice: Subject to any disclaimer, the term of this patent is extended or adjusted under 35 U.S.C. 154(b) by 19 days.

(21) Appl. No.: 16/373,088

(22) Filed: Apr. 2, 2019

(65) Prior Publication Data
US 2019/0301630 A1   Oct. 3, 2019

(30) Foreign Application Priority Data
Apr. 3, 2018 (DE) .................... 10 2018 107 763.7

(51) Int. Cl.
*F16K 31/06* (2006.01)
*F16K 27/04* (2006.01)
(Continued)

(52) U.S. Cl.
CPC .......... *F16K 31/0668* (2013.01); *F16F 9/464* (2013.01); *F16K 1/308* (2013.01); *F16K 3/24* (2013.01); *F16K 27/048* (2013.01); *F16K 31/0655* (2013.01); *F16K 31/0675* (2013.01); *B60G 17/015* (2013.01); *F16K 31/0693* (2013.01)

(58) Field of Classification Search
CPC ...... F16K 3/24; F16K 27/048; F16K 31/0655; F16K 31/0668; F16K 31/0675; F16K 31/0693; F16F 9/464; B60G 17/015

USPC ....................... 251/129.18, 129.19
See application file for complete search history.

(56) References Cited

U.S. PATENT DOCUMENTS 4,546,795 A * 10/1985 Okamoto ............ F16K 31/0648
137/624.15
4,711,269 A * 12/1987 Sule .................... F16K 31/0634
137/625.5
(Continued)

FOREIGN PATENT DOCUMENTS

DE    102008035899 A1   2/2010
DE    102008015416 B4   10/2012
(Continued)

OTHER PUBLICATIONS

Extended European Search Report dated Dec. 11, 2019, in connection with corresponding EP Application No. 19164356.8 (11pgs., including machine-generated English translation).

*Primary Examiner* — Matthew W Jellett
(74) *Attorney, Agent, or Firm* — Maier & Maier, PLLC

(57) ABSTRACT

An electromagnetically actuated piston slide valve and an assembly set for such a valve with which an NC valve and an NO valve can be fabricated. Such a valve of the NC construction type comprises a valve housing with corresponding connectors and a fluid passage. A slide coupled with a magnetic armature is provided for regulating a free cross-sectional area of the fluid passage. A first spring urges the slide in an opening direction and a second spring urges the slide in an opposite closing direction, wherein the first and the second spring are adapted such that, in the electrically unenergized state of the coil, the slide adopts a position in which the fluid passage is closed.

10 Claims, 2 Drawing Sheets

(51) Int. Cl.
  *F16F 9/46* (2006.01)
  *F16K 3/24* (2006.01)
  *F16K 1/30* (2006.01)
  *B60G 17/015* (2006.01)

(56) References Cited

U.S. PATENT DOCUMENTS

| | | | | |
|---|---|---|---|---|
| 4,830,332 A | * | 5/1989 | Miura | F16K 31/0655 |
| | | | | 251/129.07 |
| 4,896,860 A | | 1/1990 | Malone et al. | |
| 5,503,365 A | * | 4/1996 | Backe | F16K 31/0689 |
| | | | | 251/129.07 |
| 6,386,218 B1 | | 5/2002 | Ness et al. | |
| 7,588,229 B2 | * | 9/2009 | Eiser | B60T 8/363 |
| | | | | 251/129.02 |
| 10,527,120 B2 | * | 1/2020 | Bahr | F16K 31/0668 |
| 2005/0098211 A1 | * | 5/2005 | Ichinose | F16K 31/0634 |
| | | | | 137/82 |
| 2017/0074417 A1 | * | 3/2017 | Okawara | F16K 31/0686 |
| 2019/0249792 A1 | * | 8/2019 | Bahr | H01F 7/128 |

FOREIGN PATENT DOCUMENTS

| | | |
|---|---|---|
| DE | 10 2013 106 215 A1 | 12/2014 |
| DE | 10 2103 210 645 A1 | 12/2014 |
| DE | 102013106214 A1 | 12/2014 |
| DE | 102012201963 B4 | 9/2015 |
| EP | 0 055 518 A1 | 7/1982 |
| EP | 1538366 B1 | 2/2006 |

* cited by examiner

MAGNETIC VALVE

FIELD

The present disclosure relates to a magnetic valve, in particular an electromagnetically actuated piston slide valve, for example for a shock absorber of a vehicle, and to an assembly set for such a magnetic valve.

BACKGROUND

An electromagnetically actuated piston slide valve can be used as a throttle valve in a hydraulic shock absorber of a vehicle in order to adjust a shock absorber characteristic to be "hard" or "soft". By means of the adjustable throttle valve the flow resistance of the valve and thereby the shock-absorbing effect of the overall system can be changed in dependence on the electrical energization of the exciting coil of the valve. The valve connects two shock absorber chambers here, wherein pressure surges on the shock absorber cause a fluid dislocation from one shock-absorber chamber into the other shock-absorber chamber. The valve usually has a traversal direction, wherein on a shock absorber two such valves are attached in each case. One valve is used for the rebound stage (extension of the piston rod of the shock absorber) and one is used for the compression stage (retraction of the piston rod of the shock absorber).

Basically, two principles of action of such valves are known. A valve can be closed in the electrically unenergized state, i.e. without electrical current being applied, is and then referred to as an NC valve (NC: "normally closed"). When a valve is open in the electrically unenergized state, it is referred to as an NO valve (NO: "normally open"). In addition, also NO valves with a so-called fail-safe position are known, which adopt a predetermined position between the completely closed and the completely opened position in the electrically unenergized state.

From DE 10 2008 035 899 A1 and DE 10 2013 106 214 A1 magnetic valves with a fail-safe position are known in which the valve is partially opened, i.e. a position between the maximally opened and closed position in the electrically unenergized state. This is achieved by a bipartite magnetic armature. When the coil of the valve is electrically energized, the two parts of the magnetic armature are coupled with each other. The magnetic armature and thus the piston (also referred to as slide) of the valve can be moved to the maximally opened position and maintained there with a basic electrical energization. When the current is further increased, the slide moves continuously in the direction of the closed position.

Various principles are known likewise with respect to the structure and the arrangement of the slide and the passage openings. Piston slide valves with an axially displaceable slide, for example in the form of a hollow cylindrical piston, for regulating the free cross-sectional area of the passage openings, which is guided on a pin, are known for example from EP 1 538 366 B1 or DE 10 2008 015 416 B4. The valves here are NC valves. In contrast, the slide is guided on its outer side in the magnetic valve of DE 10 2012 201 963 B4. The valve here is an NO valve.

The outer structure of NC and NO valves, that is, for example, the required construction space and the interfaces or connectors, usually is the same. However, NC and NO valves differ from each other with respect to the inner construction. In particular, the complex and function-defining parts, such as the slide and the valve body with the passage openings, are configured differently.

SUMMARY

It is therefore the object of the invention to supply a magnetic valve, in particular an electromagnetically actuated piston slide valve, which permits employing function-defining parts, such as the slide and the valve body with the passage openings, in both the NC and the NO principle of action.

The object is achieved by an electromagnetically actuated piston slide valve and an assembly set for such a valve having the features of the independent claims. Preferred embodiments and further developments are specified in the dependent claims.

A piston slide valve according to the invention comprises a first and a second biasing device which are supported on the valve housing such that they act in opposite directions, as will be explained in more detail in the following. In particular, the first and the second biasing device can be a spring in each case, such as a helical spring. The piston slide valve according to the invention can be used advantageously in a shock absorber for a motor vehicle. For example, one valve according to the invention can be used on each shock absorber for the rebound stage and the compression stage.

The first biasing device rests against the valve housing in such a manner that a force of the first biasing device acts in an opening direction. The opening direction is that axial direction in which the slide is displaced in order to release the fluid passage at least partially. Vice versa, the closing direction is that axial direction in which the slide is moved in order to close the fluid passage. The closing direction is opposite to the opening direction. The second biasing device rests against the valve housing in such a manner that a force of the second biasing device acts in the closing direction. The first and the second biasing device are further adapted, i.e. for example dimensioned with respect to their spring constant, in such a manner that, in the electrically unenergized state of the coil, the slide adopts a position in which the fluid passage is closed. In other words, this is an NC valve. By electrically energizing the coil, the slide can be axially displaced against the force of the second biasing device into a position in which the fluid passage is opened at least partially.

Advantageously, the first and the second biasing device are adapted such that, upon electrically energizing the coil with a predetermined current intensity, the absolute value of the sum of the force of the first biasing device and of a force caused by the electromagnetic field and acting on the magnetic armature exceeds the absolute value of the force of the second biasing device. Preferably, in the electrically unenergized state of the coil, the absolute value of the force of the second biasing spring is greater than the absolute value of the force of the first biasing spring, for example twice as great. In other words, the second biasing device which is responsible for the fundamental NC mode of action of the valve is stronger than the first biasing device. The force acting on the magnetic armature through the electrical energizing of the coil acts in the same direction as the force of the first biasing device, so that the force of the stronger second biasing device is overcome for opening the valve upon electrically energizing the coil.

The valve according to the invention is an NC valve. Known NC valves usually have only one biasing device which urges the slide in a position in which the fluid passage is closed. As mentioned, this biasing device corresponds to the second biasing device of the valve according to the invention. Providing two mutually opposing biasing devices permits using the slide also in an NO valve. For this purpose the second biasing device is simply omitted and the magnetic armature is replaced by a different magnetic armature, as will be explained in more detail in the following with reference to the assembly set. The function-determining parts, such as the slide and the valve body with the fluid passage and the fluid connectors, remain identical.

A number of advantages can be achieved when the function-determining hydraulics parts of the valve are identical for an NC valve and an NO valve. For example, only one hydraulics assembly needs to be fabricated for both variants, thereby reducing effort and costs per valve due to the larger numbers. No different machines are required, so that the serial fabrication is facilitated, since both valve variants can be fabricated in one common mounting facility. Due to the smaller number of individual parts the administrative effort in the fabrication can be reduced as well.

In particular, an assembly set can be supplied that contains components for both the above-described NC valve and an NO valve. For this purpose the assembly set, in addition to the parts described above in connection with the piston slide valve according to the invention, additionally contains a second magnetic armature which can be employed as an alternative to the above-described magnetic armature. The second magnetic armature can be arranged in the valve housing and coupled with the slide, so that said magnetic armature is axially displaceable in the valve housing by generating an electromagnetic field through electrically energizing a coil, so that, by electrically energizing the coil, the slide is axially displaceable against the force of the first biasing device into a position in which the fluid passage is closed. In other words, by omitting the second biasing device and by using the second magnetic armature instead of the above-described magnetic armature, thus an NO valve can be realized which has the first biasing device and the same slide and the same valve body as the above-described NC valve.

In a preferred embodiment, the second magnetic armature can be configured such that by means of the assembly set an NO valve with the fail-safe function explained at the outset can be assembled. For this purpose, the second magnetic armature is configured to be bipartite and has a third biasing device, in particular a spring, which is arranged such that it urges apart axially a first part and a second part of the second magnetic armature. The first part is connected rigidly to a piston rod which is couplable with the slide, whereas the second part is axially displaceable on the piston rod. Thereby the slide can adopt a position in the electrically unenergized state in which the fluid passage is partially opened. Upon an initial electrical energization of the coil the two parts of the magnetic armature are coupled with each other against the force of the third biasing device, and the slide is preferably axially displaced into a position in which the fluid passage is closed. A position in which the fluid passage is maximally opened can be maintained then at a lower basic electrical energization (in particular at a minimal electrical energization). Upon increasing electrical energization, the slide can then be axially displaced against the force of the first biasing device into a position in which the fluid passage is closed. Without electrical energization of the coil the slide then moves again into the position in which the fluid passage is partially opened.

The assembly set can thus be employed on the one hand to assemble an electromagnetically actuated piston slide valve in an NC mode of action, which contains the valve housing, in particular the valve body thereof, the slide, the first biasing device, the second biasing device and the first magnetic armature. On the other hand, the assembly set can be employed to assemble an electromagnetically actuated piston slide valve in an NO mode of action, which contains the valve housing, in particular the valve body thereof, the slide, the first biasing device and the second magnetic armature. The following explanations apply to both variants, unless stated otherwise, but in particular to the piston slide valve according to the invention of the NC construction type described at the outset.

The slide and the magnetic armature can be configured as separate components. Separate means that the slide and the magnetic armature are in particular not configured in one piece and are not interconnected rigidly. However, they are coupled with each other and can, for example, adjoin and touch each other or can be coupled with each other via a further element, so that they move together in the valve housing. In most known NC valves the slide and the armature are fabricated as one part or as mechanically fixedly connected parts, in contrast. Preferably, the slide and the magnetic armature are clamped between the first biasing device and the second biasing device. In other words, the slide and the magnetic armature can be coupled with each other via a force-locking connection and thereby move together as one unit in the axial direction.

Providing the magnetic armature and the slide as separate components allows an independent guidance and/or supporting of the magnetic armature and of the slide. In other words, the slide can be guided in axially shiftable manner by a first part of the valve housing, in particular the valve body, and the magnetic armature can be supported in axially shiftable manner by a second part of the valve housing, in particular a pole tube. Preferably, the first part of the valve housing and the second part of the valve housing are different components of the valve housing, however which can be connected in a known manner.

In an advantageous embodiment, the slide and the magnetic armature are arranged such that they allow for an offset relative to each other in the radial direction. Additionally or possibly alternatively, the slide and the magnetic armature can be arranged such that they allow for an angular offset relative to each other. The offset here refers in each case to a central longitudinal axis of the slide and/or of the magnetic armature. The slide and the magnetic armature therein can be coupled via a hinge connection, for example via a ball element. Advantageously, the hinge connection allows for pivoting and for shifting in the radial direction. If the hinge comprises a ball element, said element can be embedded, for example, in a recess of at least one of the slide and of the magnetic armature. Other suitable hinge connections that allow for pivoting and/or shifting of the slide and of the magnetic armature relative to each other can be provided, such as, for example, correspondingly formed interfaces of the slide and/or of the magnetic armature.

Through the mobility of the slide and of the armature relative to each other and the decoupling of the support of the slide and of the magnetic armature, tolerance chains in the fabrication can be reduced and at the same time a robust and low-friction guidance of the slide and of the magnetic armature can be achieved. An axis offset between the slide and the magnetic armature does not have an influence on the guidance of the two parts. Moreover, through the separate configuration of the slide and of the magnetic armature, the matching magnetic armature for the NC and NO variant can be selected or the magnetic armature can be exchanged easily.

BRIEF DESCRIPTION OF THE FIGURES

The disclosure will hereinafter be described with reference to the attached drawings. The drawings are merely schematic representations and the invention is not limited to the specific represented embodiment examples. The valve according to the invention is represented in FIG. 1 in particular.

DETAILED DESCRIPTION

Figure 1:
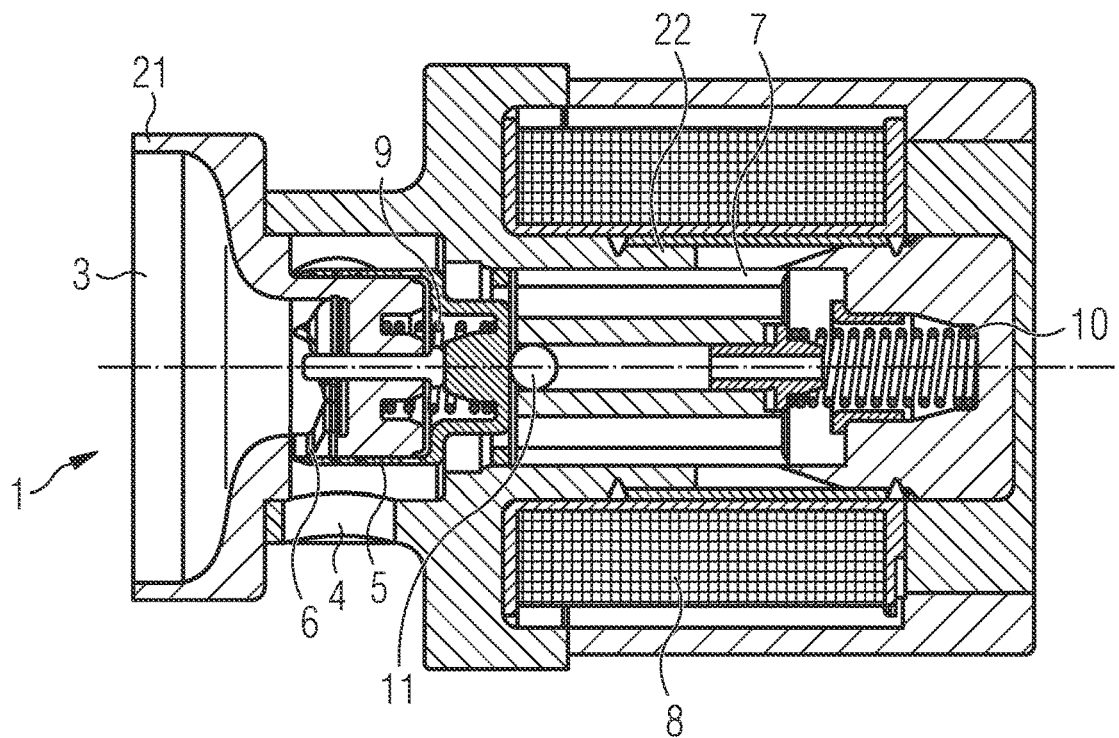
FIG. 1 shows a sectional representation of an NC magnetic valve in the electrically unenergized state.

In FIG. 1 a piston slide valve 1 is shown in a sectional view. In the electrically unenergized state represented in FIG. 1 the valve 1 is closed, i.e. this is a piston slide valve 1 of the NC construction type ("normally closed"). The valve 1 has a valve housing 2 with a valve body 21 with a first fluid connector 3, which can be a fluid inlet depending on the application, and a second fluid connector 4, which can be a fluid outlet depending on the application. In this embodiment example the fluid inlet 3 is arranged axially and the fluid outlet 4 comprises several radial openings. A slide 5, which can also be referred to as piston or piston slide and can be configured to be hollow in particular, is arranged in axially shiftable manner in the valve housing 2, in particular on the valve body 21, in order to open and close a fluid passage 6 between the first fluid connector 3 and the second fluid connector 4, more exactly to regulate a free cross section of the fluid passage 6. Such a slide is known for example from EP 1 538 366 A1. It is understood that the present invention is not limited to such a slide structure, but that also different slide or piston constructions can be employed for regulating a free cross section of a fluid passage.

The slide 5 is coupled with a magnetic armature 7, i.e. they are arranged relative to each other in the valve housing 2 such that they move together during the operation of the valve 1. The slide 5 and the magnetic armature 7 are not fixedly interconnected. Forces between the slide 5 and the magnetic armature 7 are transmitted instead via a ball 11, which allows both an offset of the longitudinal axes of the slide 5 and of the magnetic armature 7 in the radial direction and—via a gap between the slide 5 and the magnetic armature 7—an angular offset of the slide 5 and of the magnetic armature 7. In particular during the operation of the valve 1, upon axial displacement of the slide 5 and of the magnetic armature 7, the slide 5 and the magnetic armature 7 are movable relative to each other in this manner. The slide 5 and the magnetic armature 7 can be guided independently of each other thereby. The slide 5 is guided on a first part 21 of the valve housing 2 forming the valve body with the connectors 3, 4, whereas the magnetic armature 7 is guided in a second part 22 of the housing that can be referred to as pole tube. The magnetic armature 7 is preferably guided over a PTFE foil here, in order to reduce friction.

The valve 1 has a first biasing device in the form of a first spring 9 and a second biasing device in the form of a second spring 10. The second spring 10 rests against the valve housing 2 and the magnetic armature 7 and urges the magnetic armature 7 and thus the slide 5 into a position in which the slide 5 closes the fluid passage 6. On the axially opposite side of the magnetic armature 7 the first spring 9 rests against the valve body 21 and the slide 5. The slide 5 and the magnetic armature 7 are thus clamped between the first spring 9 and the second spring 10 and thus connected in force-locking manner. The force of the first spring 9 counteracts the force of the second spring 10. However, since the second spring 10 is configured to be stronger than the first spring 9, in the electrically unenergized state of the coil 8 the slide 5 is located in the position represented in FIG. 1, in which the fluid passage 6 is closed (NC principle).

When electric current is now applied at the coil 8, the magnetic armature 7 produces a force that acts in the same direction as the force of the first spring 9 and against the force of the second spring 10. When the magnetic force is sufficient, the sum of the magnetic force and of the force of the first spring 9 overcomes the force of the second spring 10, so that the slide 5 moves in the opening direction and releases the fluid passage 6. Although the first spring 9 is not absolutely necessary for operating the NC valve 1, it is achieved through this structure that the slide 5 with the first spring 9 and the value body 21 can be employed identically for an NO valve 1', as will be described in the following with reference to FIG. 2.

Figure 2:
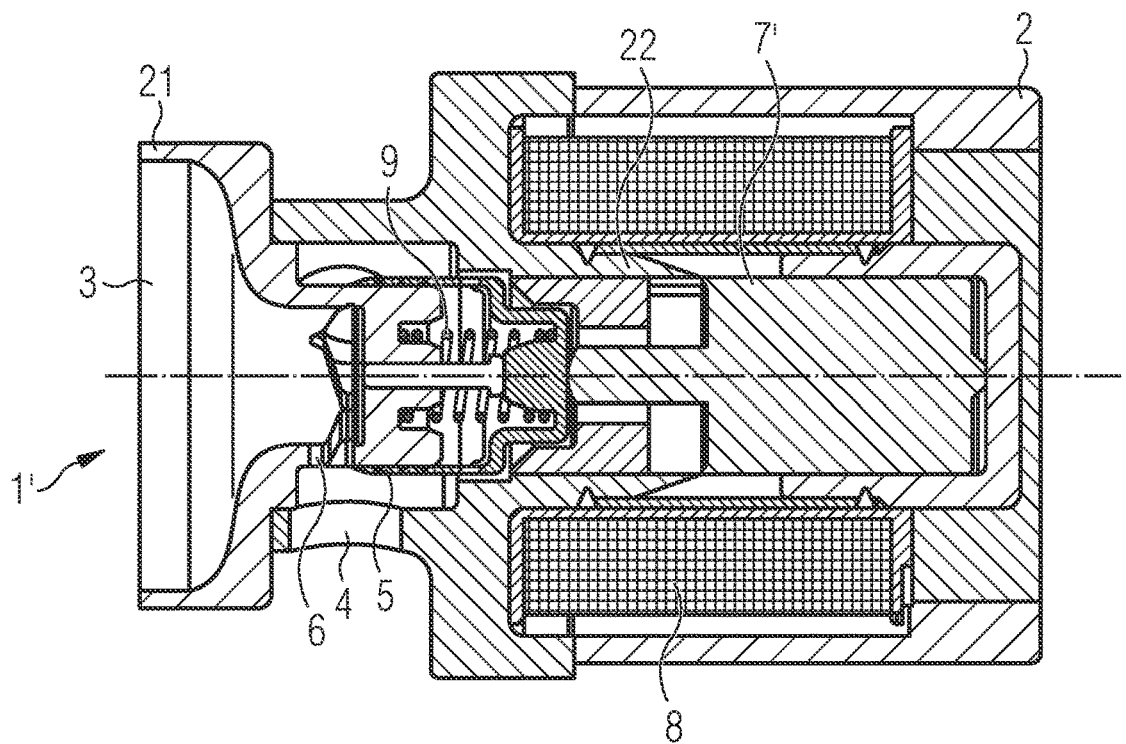
FIG. 2 shows a sectional representation of an NO magnetic valve in the electrically unenergized state.

FIG. 2 shows a piston slide valve 1' of the NO construction type, i.e. a valve that is open in the electrically unenergized state of the coil 8. As mentioned, it is largely identical to the above-described NC valve 1. In particular, the valve body 21 with the fluid passage 6 and the connectors 3, 4, the slide 5 and the first spring 9 are identical. In comparison to the above-described NC valve 1 the second spring 10 was omitted and a magnetic armature 7' with a different structure and a different basic position was chosen. The magnetic armature 7' is arranged in the valve housing 2 in such a manner that, in comparison to the above-described NC valve 1, said magnetic armature produces a magnetic force in the opposite direction, i.e. against the force of the first spring 9. Due to the missing second spring 10, the first spring 9 urges the slide 5 in the opening direction, so that, in the electrically unenergized state of the coil 8, the fluid passage 6 is opened (NO principle). When electrical current is applied to the coil 8, the slide 5 is shifted against the force of the first spring 9 in the closing direction and the fluid passage 6 is closed.

Figure 3:
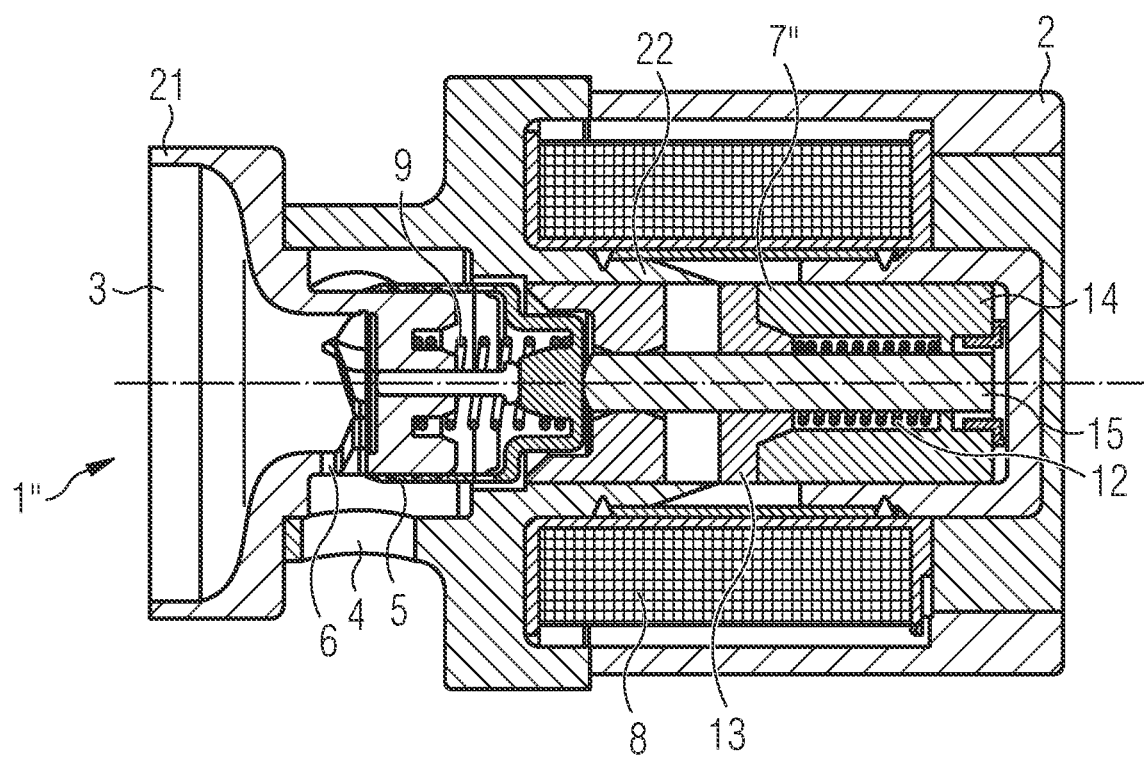
FIG. 3 shows a sectional representation of an NO magnetic valve with a fail-safe function in the maximally opened state at basic electrical energization.

FIG. 3 shows a piston slide valve 1" of the NO construction type, which, in contrast to the valve 1' represented in FIG. 2, has a fail-safe function. The magnetic armature 7" has a first part 13 and a second part 14 which are arranged on a piston rod 15 that rests against the slide 5. The slide 5 and the rest of the arrangement correspond to the valve 1' shown in FIG. 2. The first part 13 of the magnetic armature 7" is fixedly connected to the piston rod 15. The second part 14 of the magnetic armature 7" is axially displaceable on the piston rod 15, however. A spring 12, which is referred to as third spring in the following, is arranged between the two parts 13, 14 of the magnetic armature 7" and urges said parts apart. Without electrical energization the third spring 12 urges the two parts 13, 14 of the magnetic armature 7" apart, so that an equilibrium is established in which the fluid passage 6 is partially opened ("fail-safe position"). When electrical energy is applied at the coil 8, in particular upon an initial electrical energization, first the first part 13 of the magnetic armature 7" moves toward the second part 14 of the magnetic armature 7" against the force of the third spring 12, so that the two parts 13, 14 are coupled with each other. The initial electrical energization can correspond to a maximal electrical energization, so that the slide 5 is initially displaced into a position in which the fluid passage 6 is opened. The two parts 13, 14 of the magnetic armature 7" adhere to each other magnetically now, so that a position can be maintained at a basic electrical energization (minimal electrical energization) in which the fluid passage 6 is maximally opened (also through the force of the first spring 9). This state is represented in FIG. 3. Proceeding from the basic electrical energization, when the electrical energization is increased, the first and the second magnetic armature 13, 14 now move jointly against the force of the first spring 9, so that the slide 5 is moved in the direction of a position in which the fluid passage 6 is closed.

The described structure of the NC valve 1, of the NO valve 1' and of the NO valve 1" with a fail-safe function now allow making available an assembly set in which the valve body 21, the slide 5 and the first spring 9 can be employed identically for an NC valve or an NO valve. The slide 5 and the valve body 21 with the fluid passage 6 and the connectors 3, 4 in particular form the function-determining hydraulics parts which are complex and expensive. By jointly using these parts for both valve variants, the fabrication of both valve variants can be simplified and made more cost-effective.

The invention claimed is:

1. An electromagnetically actuated piston slide valve, comprising:
   a valve housing with a first fluid connector and a second fluid connector and at least one fluid passage connecting the two fluid connectors,
   a piston slide which is axially displaceable in the valve housing for regulating a free cross-sectional area of the fluid passage by opening and closing radial openings on a valve body,
   a first biasing spring which rests against the valve housing in such a manner that a force of the first biasing spring acts in an opening direction, wherein the slide at least partially releases the fluid passage upon displacement in the opening direction,
   a second biasing spring which rests against the valve housing in such a manner that a force of the second biasing spring acts in a closing direction opposite to the opening direction, wherein the first and the second biasing device are adapted such that, in an electrically unenergized state of a coil, the slide adopts a position in which the fluid passage is closed, and
   a magnetic armature coupled with the slide, wherein, by the magnetic armature, by producing an electromagnetic field through electrically energizing the coil, the slide is axially displaceable via the magnetic armature and the first spring in a proportional manner in the valve housing against the force of the second biasing spring into a position in which the fluid passage is at least partially opened wherein, in the electrically unenergized state of the coil, the absolute value of the force of a second biasing spring is greater than the absolute value of the force of a first biasing spring.

2. The piston slide valve according to claim 1, wherein the first and the second biasing device are adapted such that, upon electrically energizing the coil with a predetermined current intensity, the absolute value of the sum of the force of the first biasing device and of a force caused by the electromagnetic field and acting on the magnetic armature exceeds the absolute value of the force of the second biasing device.

3. The piston slide valve according to claim 1, wherein the slide is guided in axially shiftable manner by a first part of the valve housing and the magnetic armature is guided in axially shiftable manner by a second part of the valve housing, wherein the first part of the valve housing and the second part of the valve housing are preferably different components of the valve housing.

4. The piston slide valve according to claim 1, wherein the slide and the magnetic armature are configured as separate components.

5. The piston slide valve according to claim 1, wherein the slide and the magnetic armature are clamped between the first biasing device and the second biasing device.

6. The piston slide valve according to claim 1, wherein, wherein the slide and the magnetic armature are arranged such that they allow for an offset relative to each other in the radial direction.

7. The piston slide valve according to claim 1, wherein the slide and the magnetic armature are arranged such that they allow for an angular offset relative to each other.

8. The piston slide valve according to claim 1, wherein the magnetic armature and the slide are coupled via a hinge connection.

9. The piston slide valve according to claim 8, wherein the hinge connection comprises a ball element.

10. The piston slide valve according to claim 1, wherein the first fluid connector is arranged axially relative to the valve housing and the second fluid connector is arranged radially relative to the valve housing.

* * * * *